(12) United States Patent
Payot et al.

(10) Patent No.: US 7,909,133 B2
(45) Date of Patent: Mar. 22, 2011

(54) GLAZING UNIT HAVING AN IMPROVED VIBROACOUSTIC DAMPING PROPERTY, PROCESS FOR MANUFACTURING SUCH A GLAZING UNIT AND PROCESS FOR ACOUSTIC PROTECTION IN A VEHICLE PASSENGER COMPARTMENT

(75) Inventors: Sylvain Payot, Compiegne (FR); David Fournier, Breteuil (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 12/680,746

(22) PCT Filed: Oct. 9, 2008

(86) PCT No.: PCT/FR2008/051830
§ 371 (c)(1),
(2), (4) Date: Mar. 30, 2010

(87) PCT Pub. No.: WO2009/053620
PCT Pub. Date: Apr. 30, 2009

(65) Prior Publication Data
US 2010/0206663 A1 Aug. 19, 2010

(30) Foreign Application Priority Data

Oct. 26, 2007 (FR) ..................................... 07 58622

(51) Int. Cl.
| | |
|---|---|
| *F16F 15/02* | (2006.01) |
| *F16F 15/04* | (2006.01) |
| *F16F 15/08* | (2006.01) |
| *F16F 15/00* | (2006.01) |
| *F16F 7/00* | (2006.01) |

(52) U.S. Cl. .......................... 181/208; 181/207; 181/289
(58) Field of Classification Search .................. 181/208, 181/209, 207, 289; 296/93, 84.1; 428/343, 428/304.4, 317.7, 355 RA
See application file for complete search history.

(56) References Cited

U.S. PATENT DOCUMENTS

| | | | | |
|---|---|---|---|---|
| 3,117,054 A | * | 1/1964 | Antonucci | 428/317.1 |
| 3,160,549 A | * | 12/1964 | Caldwell et al. | 428/317.3 |
| 3,205,972 A | * | 9/1965 | Stricker et al. | 181/208 |
| 3,386,527 A | * | 6/1968 | Daubert et al. | 181/208 |
| 3,833,404 A | * | 9/1974 | Sperling et al. | 428/413 |
| 3,876,034 A | * | 4/1975 | Antonini | 181/208 |
| 4,346,782 A | * | 8/1982 | Bohm | 181/207 |
| 4,490,942 A | | 1/1985 | Arnheim et al. | |
| 4,516,658 A | * | 5/1985 | Scarton et al. | 181/208 |

(Continued)

FOREIGN PATENT DOCUMENTS

DE 3113268 A1 * 10/1982

(Continued)

*Primary Examiner* — Edgardo San Martin
(74) *Attorney, Agent, or Firm* — Oblon, Spivak, McClelland, Maier & Neustadt, L.L.P.

(57) ABSTRACT

A glazing unit with an improved vibroacoustic damping property including at least one sheet of glass and at least one vibroacoustic damping strip that is attached to at least one of the faces of the glass sheet and that includes at least one component made of damping material having a loss factor greater than 0.2. The strip is not joined to any other device on the opposite side from the glass sheet and the component made of damping material has a Young's modulus greater than 800 MPa, at 20° C., for a particular frequency corresponding to the critical frequency of the glazing unit to within plus or minus 30%.

14 Claims, 3 Drawing Sheets

U.S. PATENT DOCUMENTS

| | | | | |
|---|---|---|---|---|
| 4,734,323 | A * | 3/1988 | Sato et al. | 428/317.3 |
| 4,778,028 | A | 10/1988 | Staley | |
| 4,860,851 | A * | 8/1989 | Krevor et al. | 181/207 |
| 4,923,034 | A * | 5/1990 | Okuzawa et al. | 181/207 |
| 4,962,826 | A * | 10/1990 | House | 181/207 |
| 5,895,538 | A * | 4/1999 | Hatayama et al. | 156/87 |
| 5,945,643 | A * | 8/1999 | Casser | 181/290 |
| 6,119,807 | A * | 9/2000 | Benson et al. | 181/208 |
| 6,177,173 | B1 * | 1/2001 | Nelson | 428/137 |
| 6,478,110 | B1 * | 11/2002 | Eatwell et al. | 181/207 |
| 6,536,555 | B1 * | 3/2003 | Kelsic et al. | 181/207 |
| 6,668,974 | B1 * | 12/2003 | Mottelet et al. | 181/284 |
| 6,821,629 | B2 * | 11/2004 | Garnier et al. | 428/426 |
| 7,240,766 | B2 * | 7/2007 | Rogers et al. | 181/209 |
| 7,344,772 | B2 * | 3/2008 | Rehfeld et al. | 428/304.4 |
| 7,640,808 | B2 * | 1/2010 | Rehfeld et al. | 73/570 |
| 7,669,910 | B2 * | 3/2010 | Charlier | 296/93 |
| 7,721,844 | B1 * | 5/2010 | Lewis et al. | 181/207 |
| 7,837,147 | B2 * | 11/2010 | Liguore et al. | 244/119 |
| 2001/0047058 | A1 * | 11/2001 | Johnson et al. | 525/192 |
| 2004/0035066 | A1 * | 2/2004 | Leconte | 52/204.591 |
| 2006/0165977 | A1 * | 7/2006 | Rehfeld et al. | 428/343 |
| 2008/0056505 | A1 | 3/2008 | Rehfeld et al. | |
| 2009/0188746 | A1 * | 7/2009 | Yamada et al. | 181/207 |
| 2010/0018133 | A1 * | 1/2010 | Boyadjian et al. | 52/144 |
| 2010/0018799 | A1 * | 1/2010 | Boyadjian et al. | 181/290 |
| 2010/0043555 | A1 * | 2/2010 | Charlier | 73/584 |
| 2010/0133037 | A1 | 6/2010 | Payot et al. | |
| 2010/0206662 | A1 * | 8/2010 | Mitsuoka et al. | 181/207 |

FOREIGN PATENT DOCUMENTS

| | | |
|---|---|---|
| DE | 36 17 602 | 11/1987 |
| DE | 103 37 007 | 3/2005 |
| EP | 0 387 148 | 9/1990 |
| FR | 2 877 881 | 5/2006 |
| WO | 2004 012952 | 2/2004 |

* cited by examiner

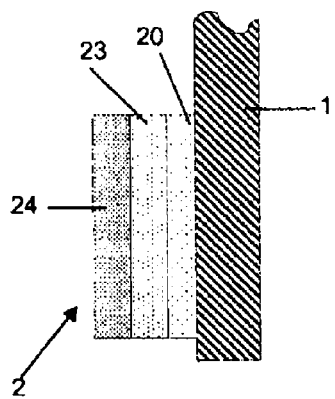
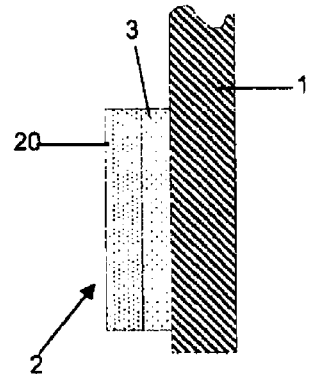
FIG.4　　　　　　　　FIG.5
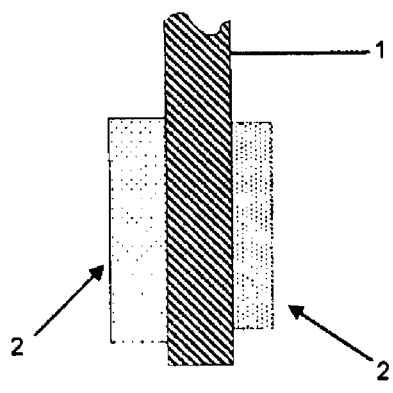
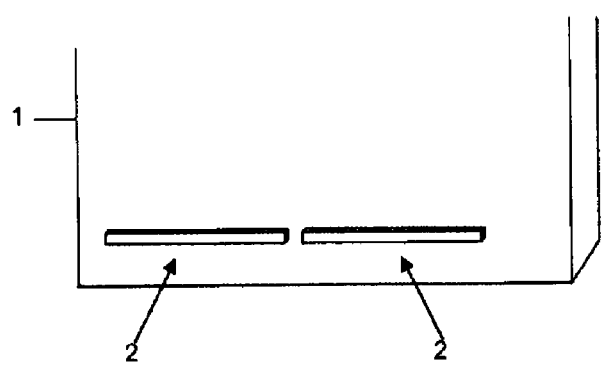
FIG.6　　　　　　　　FIG.7

GLAZING UNIT HAVING AN IMPROVED VIBROACOUSTIC DAMPING PROPERTY, PROCESS FOR MANUFACTURING SUCH A GLAZING UNIT AND PROCESS FOR ACOUSTIC PROTECTION IN A VEHICLE PASSENGER COMPARTMENT

The present invention relates to a glazing unit having an improved vibroacoustic damping property that comprises a vibroacoustic damping device, and also to a process for reducing the acoustic and vibration disturbance in a passenger compartment, in particular a mobile passenger compartment such as a vehicle, in particular a motor vehicle.

In addition to motor vehicles or other types of vehicle such as trucks, coaches, agricultural equipment, the invention applies to all types of locomotive machines having a closed or substantially closed passenger compartment, such as aircraft, trains, boats, submarines, etc.

The glazing units associated with vehicles, especially motor vehicles, are provided with vibroacoustic damping means that act to absorb the vibration waves that propagate through the glazing unit with a view to improving the acoustic comfort inside vehicles.

In a motor vehicle, the sources of annoyance of mechanical, thermal, visibility, etc. origin have gradually been overcome. However, improvement in acoustic comfort is still very much an ongoing concern.

Noise of aerodynamic origin, that is to say noise created by the friction of the air over the moving vehicle has, at least in part, been dealt with at its source: in order to save energy, the shapes have been modified thus improving penetration through the air and reducing the turbulence which itself is a source of noise. Among the walls of a vehicle that separate the source of external aerodynamic noise from the interior space where the passenger is situated, the glazing units are obviously the most difficult to deal with.

It is presently known to provide laminated glazing units in which the thermoplastic interlayer is chosen in a suitable manner in order to have improved vibroacoustic damping properties.

European patent EP-B1-0 387 148 thus provides laminated glazing units that achieve a good insulation against noise, in particular of aerodynamic origin, that is to say at high frequency, between 800 and 10 000 Hz.

Moreover, such laminated glazing units make it possible to avoid a sudden drop at the critical frequency in transmission loss which is representative of acoustic insulation. The critical frequency is specific to the composition of the glazing unit (density and Young's modulus of the constituent components, thicknesses) and corresponds to a spatial and frequential coincidence of bending waves in the glazing unit and of acoustic waves in the fluid surrounding the glazing unit, such as air. It is typically around about 4000 Hz for a glazing unit having a thickness close to 3 mm.

It is at this critical frequency, which is located in the range of frequencies, particularly audible to the human ear (between 1000 and 6000 Hz), that noises may therefore be increased. It is therefore desirable to have a good insulation performance to noise at this frequency.

An alternative solution (since certain glazing units are not laminated) or complementary solution to the use of laminated glazing units having a vibroacoustic damping property may consist in joining to the periphery of the glazing unit and between the glazing unit and the bodywork, a strip having a vibroacoustic damping property that is attached to the glazing unit and the bodywork and that consists of a juxtaposition or not of several damping materials.

A strip is known from patent application WO 04/012952 that, in order to provide such a vibroacoustic damping property, must have an equivalent real linear stiffness $K'_{eq}$ at least equal to 25 MPa, in combination with an equivalent loss factor $\tan \delta_{eq}$ at least equal to 0.25. The equivalent linear stiffness is the equivalent stiffness of the strip per linear meter of strip, the stiffness being characterized by the rigidity (namely the Young's modulus for work in tension-compression) of the materials constituting the strip and by the geometry of the strip.

In this type of strip, only stresses and deformations experienced by the materials when working in tension-compression in their direction normal to the glazing unit are taken into consideration, work in shear being negligible. This is because the bodywork is so rigid by comparison with the strip that it does not deform and cannot absorb vibrational energy. Only the strip deforms significantly and dissipates mechanical energy by working mainly in tension-compression.

This type of damping strip also constituting the peripheral seal of the glazing unit is therefore suitable since it ensures the connection between the glazing unit and the bodywork. However, not all the glazing units of a vehicle are attached over their entire periphery to the bodywork; certain of them, such as opening side windows, are mobile. Thus, this peripheral seal configuration providing the role of damping means may not be suitable for the latter windows.

The object of the invention is therefore to provide a glazing unit, more particularly at high frequency, with a vibroacoustic damping means that is an alternative or is complementary to the existing means such as laminated glazing units or the peripheral bonding seals of a glazing unit.

According to the invention, the glazing unit comprises at least one sheet of glass and at least one vibroacoustic damping strip which is attached to at least one of the faces of the glass sheet and that comprises at least one component made of a damping material, having a loss factor greater than 0.2 and a Young's modulus greater than 800 MPa, at 20° C. for a particular frequency $f_p$ that corresponds to the critical frequency of the glazing unit to within plus or minus 30%. The glazing unit is also characterized in that the strip is not joined to any other device on the opposite side from the glass sheet.

The Young's modulus of the damping material and its loss factor are measured using a viscoanalyzer.

In a known manner, the critical frequency of the glazing unit is given by the equation $f_c \approx 11.6/h$, where h is the thickness of the glazing unit in m.

Thus, the glazing unit provides vibroacoustic damping properties both in combination with the bodywork of the vehicle and independently of the bodywork; the damping material fulfills its role as a dissipater of vibrational energy, but instead of working in tension-compression in a plane normal to the glazing unit, the strip works in tension-compression in the plane of the glazing unit. This work in tension-compression in the plane of the glazing unit that is instead preferably known as work in elongation, proves to be astonishingly effective.

The inventors have thus demonstrated that the combination of a strip with the glazing unit in order to dissipate the vibrational energy is even more effective when the material of the strip is damping (which is linked to the loss factor) and especially when the strip is rigid (which is linked to the Young's modulus of the material or materials constituting the strip) in order to ensure work in elongation.

Preferably, the strip is arranged in the vicinity of the edge or at the edge of the glazing unit. It does not form a seal. It preferably extends over at most the length of one side of the glazing unit. Its geometry may also be adapted to the shape of the glazing unit. The strip could thus have a conventional rectangular shape, or a more complex shape such as a trapezium, for example.

According to one feature, the strip may comprise a plurality of components made of a damping material.

According to another feature, the glazing unit may comprise several strips joined to the same face of the glazing unit and/or to the two opposite faces of the glazing unit.

According to one embodiment, the strip comprises at least one component made of a damping material, and one rigid interlayer component that is arranged between the damping material component and the glazing unit, the rigid interlayer component having a loss factor of less than 0.2 and a Young's modulus at least two times greater than that of the damping material at 20° C. and for the particular frequency chosen.

According to one exemplary embodiment, the damping material is bituminous. It may also be a filled carbon-based polymer.

Advantageously, the glazing unit of the invention is housed in the bodywork of a vehicle, especially a motor vehicle, the strip being hidden from view.

The glazing unit is more particularly an opening side window.

Another subject of the invention is a process for manufacturing a glazing unit with a view to reducing the acoustic and vibration disturbance in a passenger compartment of a vehicle, in particular a motor vehicle, comprising such a glazing unit, the process consisting in joining to the glazing unit at least one vibroacoustic damping strip, characterized in that:
 a strip is provided that has at least one damping material component having a loss factor greater than 0.2 and a Young's modulus greater than 800 MPa at 20° C. for a particular frequency corresponding to the critical frequency of the glazing unit, to within plus or minus 30%; and
 the profile is attached to at least one of the faces of the glazing unit.

The attachment is carried out by any suitable means, preferably by bonding using an adhesive that is compatible with the glass and with the material of the strip.

The strip may comprise on one of its faces, the face intended for attachment, bonding means of the double-sided adhesive tape type.

Finally, the invention also relates to a process for acoustic protection in a passenger compartment of a vehicle, in particular a motor vehicle, comprising a glazing unit of improved vibroacoustic damping that comprises at least one vibroacoustic damping strip, characterized in that it consists in using a strip comprising at least one damping material component having a loss factor greater than 0.2 and a Young's modulus greater than 800 MPa at 20° C. and for a particular frequency corresponding to the critical frequency of the glazing unit, to within plus or minus 30%, the strip being attached to one of the faces of the glazing unit.

For the manufacturing or acoustic protection processes, use will be made advantageously of a glazing unit of the invention as described above.

Other details and advantages of the invention will now be described, with respect to the appended drawings in which:

FIGS. 3 to 6 are partial cross-sectional views of several embodiment variants of FIG. 1;

FIG. 7 is a partial perspective view of another glazing unit variant, equipped here with two strips according to the invention;

FIGS. 1 to 8 are views that are not to scale in order to facilitate the understanding thereof.

Figure 1:
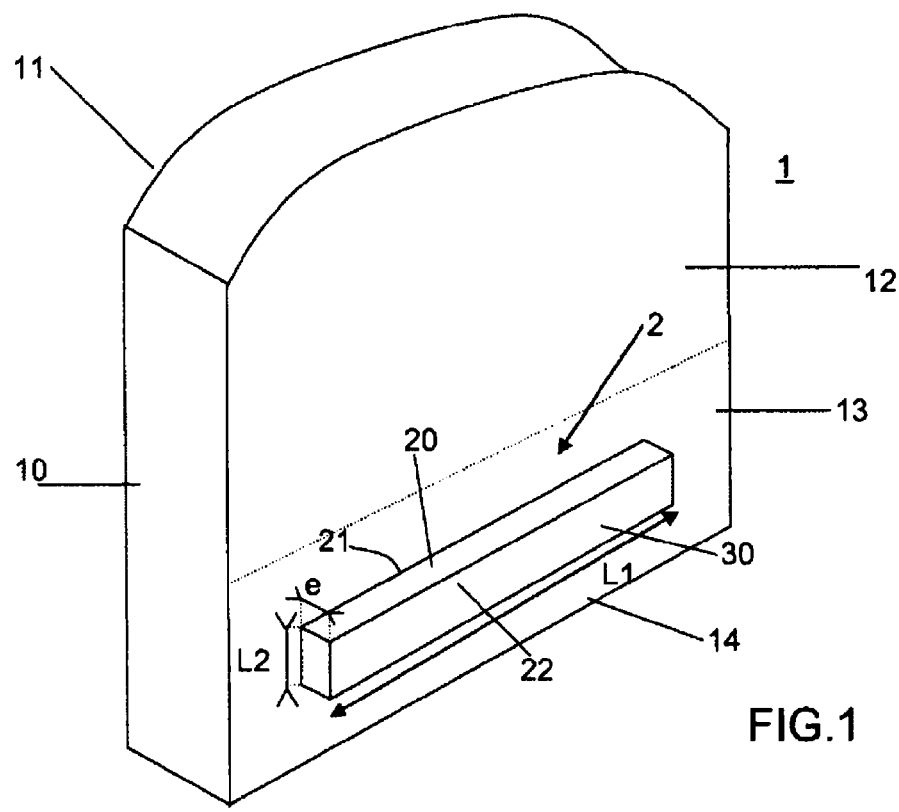
FIG. 1 is a perspective view of a glazing unit equipped with a strip according to the invention.
Figure 2:
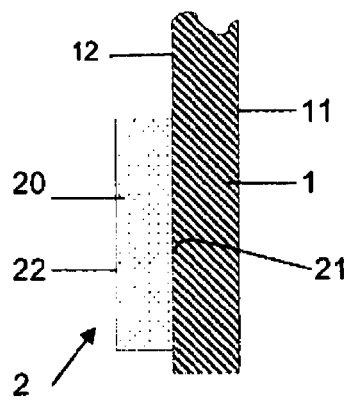
FIG. 2 is a partial cross-sectional view of the glazing unit from FIG. 1.
Figure 3:
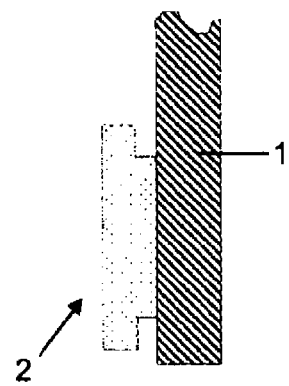

FIGS. 1 and 2 illustrate a glazing unit 1 equipped with a vibroacoustic damping means of the invention formed by at least one strip 2.

The glazing unit 1 is intended to be housed in a bodywork of a vehicle such as a motor vehicle, for example in an inner door shell, to form a side glazing unit, advantageously an opening glazing unit. This glazing unit is here monolithic and therefore comprises one sheet of glass 10, but it could, for example, be laminated and comprise a plastic interlayer sheet sandwiched between two glass sheets.

The glazing unit 1 has two opposing faces 11 and 12; one is intended to be opposite the interior of the vehicle, whereas the other will be turned toward the outside environment.

Furthermore, the glazing unit 1 comprises a marginal part 13 that is located on a side 14 and delimited by the dotted lines in FIG. 1. This part is known as the low band in the case of an opening side glazing unit. This marginal part is intended not to be visible since it has to be housed in the bodywork for attachment of the glazing unit.

The strip is positioned in the vicinity of the edge of the glazing unit without forming a seal. It is preferably arranged along a single side of the glazing unit.

The strip 2 comprises a component 20 made of damping material.

The damping material component 20 has a loss factor greater than 0.2 and a Young's modulus greater than 800 MPa, at 20° C. and advantageously for a particular frequency $f_p$ of the glazing unit that corresponds to the critical frequency of the glazing unit, or to within plus or minus 30% of this critical frequency. Typically, the critical frequency of a glazing unit is between 2000 and 5000 Hz depending in particular on the thickness of the glazing unit.

Specifically, it is found that for vehicles, in particular motor vehicles, the range of frequencies for which it is desired to obtain an improved insulation corresponds to the range of frequencies located around the critical frequency of the glazing unit. A particular frequency therefore will be advantageously chosen that is equal to within plus or minus 30% of the critical frequency of the glazing unit ($f_p=f_c\pm30\%$). This is because it is around this critical frequency that the transmission of noise from the outside of the vehicle through the glazing unit is the most significant that is expressed in terms of measurements by a pronounced drop in acoustic insulation. The invention therefore relates more particularly to this frequency range in order to improve the vibroacoustic damping of a glazing unit. Thus, the particular frequency $f_p$ will more particularly be able to correspond to the critical frequency of the glazing unit.

It is noted that according to the invention the greater the contact area of the strip with the glazing unit, the better the damping.

Furthermore, the greater the thickness e of the strip, the more effective the latter will be. At constant mass of the strip it will be preferred to increase the thickness e of the strip rather than its surface area.

For example, according to FIG. 1, it will be possible to attach to a glazing unit having a thickness of 3.85 mm, and dimensions of 800 mm×500 mm, at approximately 25 mm from the edge of the glazing unit, a strip having a length L1 of 600 mm and a width L2 of 100 mm, and also a thickness e of 5 mm.

The damping component 20 comprises a face 21 for attachment to one of the faces 12 of the glazing unit and an opposite free face 22.

The attachment to the glazing unit is carried out by adhesive means compatible with each of the constituent materials of the damping component and of the glazing unit. The adhesive means are of known type, for example, self-adhesive means or means composed of a heat-activated adhesive.

The strip 2 may be composed of a single damping component 20 or of a superposition of a plurality of damping components 20, 23, 24 (FIG. 4). Each material of each component has the following characteristics: a loss factor greater than 0.2 and a Young's modulus greater than 800 MPa, at 20° C. and at a particular frequency $f_p$ of the glazing unit that corresponds to the critical frequency of the glazing unit to within plus or minus 30%.

FIG. 5 illustrates another embodiment variant of the invention. The strip 2 comprises a damping component 20 and a nondamping rigid interlayer component 3, the nondamping rigid interlayer component being sandwiched between the damping component 20 and the glazing unit. Preferably, it has the same joining surface area with the glazing unit as with the damping component.

The nondamping rigid component is composed of a material that has a loss factor of less than 0.2 and a Young's modulus greater than 1600 MPa. It is possible, for example, to use glass or polycarbonate for example with a thickness of 3 mm. The means of attachment between the various components are adapted to be compatible with the constituent materials of said components.

FIG. 6 illustrates another embodiment variant. Joined to the glazing unit 1 are two strips, with one strip respectively on each face 11 and 12 of the glazing unit, when this embodiment variant is compatible with the space requirements of the installation intended to receive the glazing unit.

It is also possible to envision, on one and the same face of the same glazing unit, the joining of a plurality of strips 2 that may or may not be juxtaposed and may or may not be abutted (FIG. 7).

Figure 8:
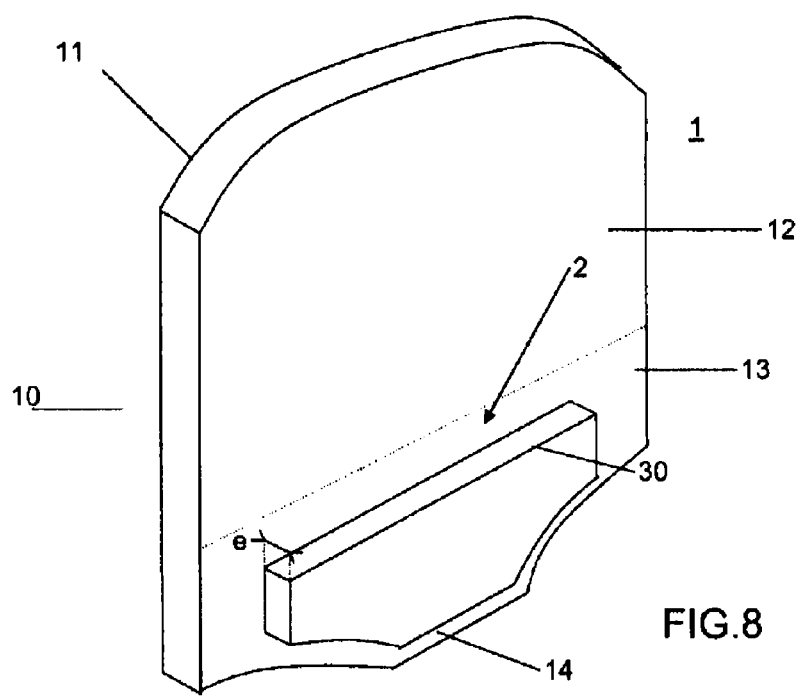
FIG. 8 shows a perspective view of a glazing unit equipped with an additional strip variant.

Finally, it is possible to use a strip having a non-rectangular geometry (FIG. 8). This geometry makes it possible to adapt in the case of a glazing unit for which the low end, generally known as the low band, is not rectilinear but curved.

As examples that are not in the least limiting, the table below mentions several damping materials for the strip to be joined to the glazing unit according to the invention, the loss factor and the Young's modulus are given at 20° C. and at a frequency of 3100 Hz (critical frequency of a 3.85 mm thick glazing unit), these values being measured using a viscoanalyzer:

| Trade name | Type of material | Young's modulus E'$_v$ (MPa) | Loss factor tan δ |
|---|---|---|---|
| Stickson from Akdev Soprema | Bituminous | 900 | 0.38 |
| Abedal from Siplast | Bituminous | 1300 | 0.25 |
| VB10 from Decibel France | Bituminous | 1200 | 0.27 |

-continued

| Trade name | Type of material | Young's modulus E'$_v$ (MPa) | Loss factor tan δ |
|---|---|---|---|
| ISODAMP C1100-12 from EARsc | Vinyl-based polymer | 900 | 0.35 |

In order to demonstrate the effectiveness of the damping means of the invention, the attenuation in the vibrational level of a glazing unit, equipped with damping means compared to the same, bare glazing unit has been highlighted over a range of frequencies from 125 to 6300 Hz including the critical frequency of the glazing unit at 3100 Hz.

A glazing unit equipped with damping means of the invention excited via an airborne route, has lower vibrational levels than the bare glazing unit since the vibrational energy of the glazing unit is dissipated through the strip 2. Hence, the pressure levels in the passenger compartment are lower, and consequently, the noises are reduced.

Figure 9:
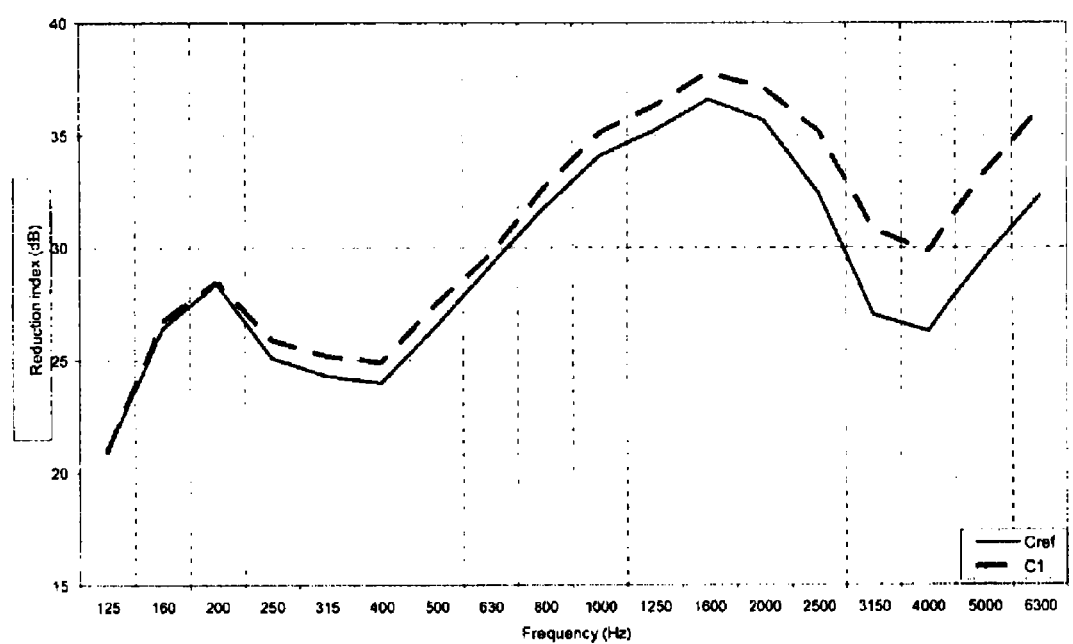
FIG. 9 shows comparative curves of acoustic insulation between a bare glazing unit and a glazing unit equipped with a strip of the invention.

FIG. 9 thus shows comparative reduction index curves obtained with, on the one hand, a glazing unit provided with damping means of the invention and, on the other hand, an equivalent glazing unit that does not comprise the damping means of the invention.

The glazing unit used as a test was a flat glazing unit with a thickness of 3.85 mm and dimensions of 800 mm×500 mm. Its critical frequency is thus close to 3100 Hz.

The Cref curve corresponds to the bare glazing unit. The C1 curve corresponds to the glazing unit equipped with the strip 2. The strip is rectangular and has the following dimensions: length L1 of 600 mm, width L2 of 100 mm, and thickness e of 5.2 mm. The material of the strip is a strip of Stickson from Akdev Soprema (cf. table above). This strip is sold commercially with a pre-applied adhesive strip that is compatible with the glass for bonding thereto.

This glazing is installed in an opening made between two reverberating chambers. It is held at its edges using corners equipped with foam strips that make it possible to ensure the sealing of the device and to recreate assembly conditions close to the case of an opening side glazing unit. The sound reduction index R per one-third octave was thus measured, according to the ISO 140-3 standard, for frequencies ranging from 125 to 6300 Hz. These measurements were carried out at the ambient temperature of 18° C.

It is evidenced, in comparison with the curves from FIG. 9, that the sound reduction of the glazing unit is improved at the critical frequency (difference of 3.8 dB over the one-third octave centered around 3150 Hz).

Consequently, while in accordance with the first objective of the invention, it is possible to dissipate a maximum of vibrational energy in the region of the critical frequency of the glazing unit (over a range that spreads from −30% to +30% of the critical frequency), the invention also makes it possible to ensure a good vibroacoustic damping over a wider range of frequencies, including at low and medium frequencies. Specifically, it can be seen in FIG. 9 that the insulation curve C1 relative to the glazing unit of the invention is underneath the curve Cref corresponding to the bare glazing unit.

The invention claimed is:
1. A glazing unit comprising:
   at least one sheet of glass;
   at least one vibroacoustic damping strip attached to at least one of faces of the glass sheet and that comprises at least one component made of damping material, wherein the strip is not joined to any other device on the opposite side from the glass sheet and the component made of damping material has a loss factor greater than 0.2 and a Young's modulus greater than 800 MPa, at 20° C., for a particular frequency corresponding to the critical frequency of the glazing unit to within plus or minus 30%.

2. The glazing unit as claimed in claim 1, wherein the strip is arranged in a vicinity of an edge or at the edge of the glazing unit.

3. The glazing unit as claimed in claim 1, wherein the strip extends over at most a length of one side of the glazing unit.

4. The glazing unit as claimed in claim 1, wherein the strip comprises a plurality of components made of a damping material.

5. The glazing unit as claimed in claim 1, comprising plural strips joined to the same face of the glazing unit and/or to two opposite faces of the glazing unit.

6. The glazing unit as claimed in claim 1, wherein the strip comprises at least one component made of damping material, and one rigid interlayer component that is arranged between the damping material component and the glazing unit, the rigid interlayer component having a Young's modulus greater than 1600 MPa and a loss factor of less than 0.2 at 20° C. for the particular frequency.

7. The glazing unit as claimed in claim 1, wherein the strip comprises, on one of its faces intended for attachment to the glazing unit, bonding means of double-sided adhesive tape type.

8. The glazing unit as claimed in claim 1, housed in bodywork of a vehicle, or a motor vehicle, the strip being hidden from view.

9. The glazing unit as claimed in claim 1, as an opening side glazing unit.

10. A process for manufacturing a glazing unit in a passenger compartment of a vehicle, or a motor vehicle, including the glazing unit, the process comprising:

joining to the glazing unit at least one vibroacoustic damping strip, wherein:
a strip is provided that has at least one damping material component having a loss factor greater than 0.2 and a Young's modulus greater than 800 MPa at 20° C. for a particular frequency corresponding to the critical frequency of the glazing unit, to within plus or minus 30%; and
the profile is attached to at least one of the faces of the glazing unit.

11. The process for manufacturing a glazing unit as claimed in claim 10, wherein the particular frequency corresponds to the critical frequency of the glazing unit, or to within plus or minus 30% of the critical frequency.

12. The process for manufacturing a glazing unit as claimed in claim 10, using a glazing unit in which the strip extends over at most a length of one side of the glazing unit.

13. A process for acoustic protection in a passenger compartment of a vehicle, or a motor vehicle, including a glazing unit of improved vibroacoustic damping that comprises at least one vibroacoustic damping strip, the process comprising:
using a strip comprising at least one damping material component having a loss factor greater than 0.2 and a Young's modulus greater than 800 MPa at 20° C. and for a particular frequency corresponding to the critical frequency of the glazing unit, to within plus or minus 30%, the strip being attached to one of faces of the glazing unit.

14. The process for acoustic protection in a vehicle passenger compartment as claimed in claim 13, using a glazing unit in which the strip is arranged in a vicinity of an edge or at the edge of the glazing unit.

* * * * *